United States Patent [19]

Gerstner et al.

[11] Patent Number: 4,800,634
[45] Date of Patent: Jan. 31, 1989

[54] METHOD OF MANUFACTURING A BICYCLE HUB SLEEVE

[75] Inventors: Richard Gerstner, Dittelbrunn; Günter Look, Grafenrheinfeld; Werner Seybold, Gädheim; Werner Steuer, Schweinfurt, all of Fed. Rep. of Germany

[73] Assignee: Fichtel & Sachs AG, Schweinfurt, Fed. Rep. of Germany

[21] Appl. No.: 57,365

[22] Filed: Jun. 2, 1987

Related U.S. Application Data

[62] Division of Ser. No. 801,453, Nov. 25, 1985, Pat. No. 4,707,034.

[30] Foreign Application Priority Data

Nov. 24, 1984 [DE] Fed. Rep. of Germany ....... 3442873

[51] Int. Cl.⁴ ............................................... B21K 1/40
[52] U.S. Cl. ...................................... 29/159.3; 29/557
[58] Field of Search ............... 29/159.3, 527.5, 527.6, 29/557; 192/6 R, 64; 301/6 R, 6 V, 105 B, 105 R

[56] References Cited

U.S. PATENT DOCUMENTS

| | | | |
|---|---|---|---|
| 1,990,510 | 12/1932 | Winkler . | |
| 2,587,864 | 3/1952 | Lefere | 29/159.3 |
| 2,997,145 | 8/1961 | Ross | 301/105 B |
| 3,494,170 | 2/1970 | Valleins . | |
| 3,874,055 | 4/1975 | Wilcox | 29/159.3 X |
| 4,182,194 | 1/1980 | Tomozawa . | |
| 4,351,569 | 9/1982 | Steuer et al. | 301/6 V |

FOREIGN PATENT DOCUMENTS

| | | |
|---|---|---|
| 58465 | 8/1982 | European Pat. Off. . |
| 378431 | 7/1923 | Fed. Rep. of Germany . |
| 2141973 | 8/1971 | Fed. Rep. of Germany . |
| 2854414 | 6/1979 | Fed. Rep. of Germany . |
| 2927138 | 1/1981 | Fed. Rep. of Germany . |
| 959480 | 3/1950 | France . |
| 672214 | 5/1952 | United Kingdom . |
| 979691 | 1/1965 | United Kingdom . |
| 1197399 | 7/1970 | United Kingdom . |
| 1212630 | 11/1970 | United Kingdom . |
| 1383351 | 2/1975 | United Kingdom . |
| 2043559 | 10/1980 | United Kingdom . |

Primary Examiner—P. W. Echols
Assistant Examiner—Andrew E. Rawlins
Attorney, Agent, or Firm—Toren, McGeady & Associates

[57] ABSTRACT

A hub sleeve for a bicycle hub is manufactured by cold-swaging or forging. The hub sleeve is integrally provided with ball bearing faces and with internal torque transmission teeth. The torque transmission teeth are obtained by radial dislocation of the wall material of the hub sleeve.

6 Claims, 2 Drawing Sheets

METHOD OF MANUFACTURING A BICYCLE HUB SLEEVE

This is a division of application Ser. No. 801,453, filed Nov. 25, 1985, now U.S. Pat. No. 4,707,034, issued Nov. 17, 1987.

BACKGROUND OF THE INVENTION

In the manufacturing of hub sleeve members for bicycle hubs it is necessary to provide on the radial inner face of the hub sleeve torque transmission teeth for torque transmission from a gear unit provided inside the hub sleeve to the hub sleeve itself with the air of driving the bicycle rear wheel. The manufacturing costs relating to the provision of the torque transmission teeth are a considerable factor within the total manufacturing costs of the hub sleeve.

STATEMENT OF THE PRIOR ART

In known bicycle hubs the hub sleeve is manufactured from a cold-deformed solid blank which has been machined on all sides. The torque transmission teeth provided integrally in the hub sleeve for cooperation with drive ratchet pawls are produced by a broaching operation or by a slotting operation. Both processes require a disproportionately high expense for special tools and manufacturing costs in total. The possibility exists of arranging a separate annular part fast in rotation in the hub sleeve which comprises the internal ratchet and per se is somewhat simpler to produce. Such an annular part however constitutes an additional component and furthermore requires a rotation-fast connection with the hub sleeve. The expense in such an arrangement is likewise not inappreciable.

From German 'Offenlegungsschrift' No. 2,906,627.1 it has been known to constitute a hub sleeve from a plurality of sheet metal members obtained by drawing operations. In this known embodiment a cylindrical middle section of one of the constituents is provided with stamped torque transmission teeth. The stamping of sheet metal such as to obtain torque transmission teeth is relatively easy in view of the small wall thickness of sheet metal. However the manufacturing of hub sleeves from sheet metal constituents raises other problems which result from small wall thickness which is a necessary consequence of using drawn sheet metal components.

OBJECT OF THE INVENTION

This invention relates to the type of hub sleeves which have a considerable wall thickness of e. g. 3 to 5 mm and more particularly 3 to 4 mm and which are profiled in such a way at their inward and/or outward face as to have longitudinal sections of different wall thickness. This is the type of hub sleeve in which in the past one has produced the torque transmission teeth exclusively by cutting operations like broaching and slotting operations as mentioned above. It is the object of the present invention to provide in this type of hub sleeve the torque transmission teeth in a more economical way than up to now.

It is a further object of the invention to combine the advantages of solid-type hub sleeves with relatively large wall thickness and manufactured by cold-swaging or forging with the advantages of the less expensive method of teeth generation by stamping.

SUMMARY OF THE INVENTION

A hub sleeve for a bicycle hub comprises a main hub sleeve member with an axis, a radially inward face having a radially inner profile line and a radially outward face having a radially outer profile line. At least one of said radially inner profile line and said radially outer profile line has deviations from a straight line such as to define longitudinal sections of said main sleeve member with differences in wall thickness. Ball bearing faces and at least one circular arrangement of torque transmission teeth are integrally formed with the main hub sleeve member at said radially inward face. The torque transmission teeth are formed by radially inward dislocations of material of said main hub sleeve member.

With this configuration inter alia the advantage is achieved that with a very economical method for swarfless production of the toothing in the interior of the solid hub sleeve, which is usable for single-ratio and multi-ratio hubs, properties important to functioning such for example as accuracy of dimension and form and also that of an attractive external configuration as a whole can be achieved.

This invention further relates to a method of manufacturing a main hub sleeve member as defined above. According to this method a raw member is profiled by forging or cold-swaging such as to approximately obtain the radially inward and radially outward faces. At least the ball bearing faces are machined by a cutting operation. The torque transmission teeth are hereupon obtained by a stamping operation using at least one radially outward stamp tool radially movable against the radially outward face of the main hub sleeve member and a support unit applied to the radially inward face and being provided with at least one recess receiving a dislocation of material. The product and the method of this invention are of particular importance in such hub sleeve configurations in which the longitudinal section of the main hub sleeve member accommodating the torque transmission teeth has an internal diameter larger than a further longitudinal section on one or both axial sides of the section accommodating the torque transmission teeth. With such a configuration it is particularly difficult to obtain the torque transmission teeth by broaching or slotting.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to the example embodiment. In detail.

DESCRIPTION OF THE PREFERRED EMBODIMENT

Figure 1:
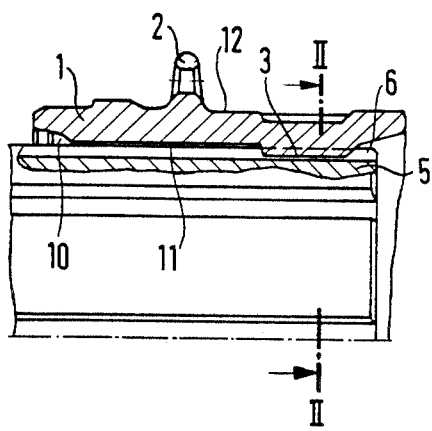
FIG. 1 shows a solid hub sleeve with tools for the swarfless production of an internal ratchet, in partial longitudinal section.

In the FIGS. 1 designates an only partially illustrated main hub sleeve member which has been produced from a solid blank by cold-swaging and/or forging and machining such as turning. The formed-on spoke flanges are designated by 2. In the region axially beside the spoke flange 2 the main hub sleeve member 1 has a formed-in internal ratchet 3, i.e. a circumferential arrangement of torque transmitting teeth, which serves for example for cooperation with radially outwardly acting pawls (not shown here) on a concentric pawl carrier part (likewise not shown). The main hub sleeve member 1 is provided with a ball bearing face 10 which has been obtained by a turning operation after the cold-swaging and/or forging operation.

Figure 2:
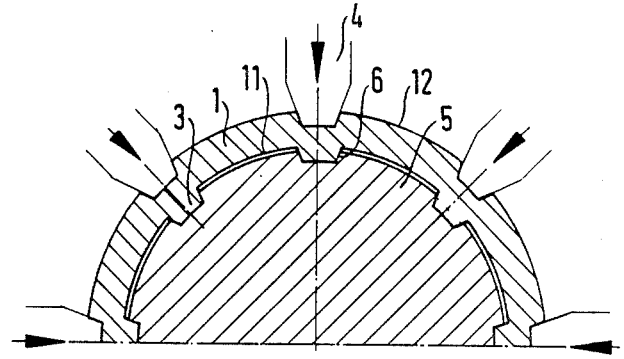
FIG. 2 shows a cross-section along the line II—II in FIG. 1 through the hub sleeve with diagrammatic representation of the swarfless production of the integral internal ratchet.

The main hub sleeve member 1 as shown in partial longitudinal section in FIG. 1 surrounds in the interior a one-piece support mandrel 5 which comprises—distributed on the circumference—recesses 6 which correspond to the negative form of the teeth to be formed swarflessly in the radially inward face 11 of the main hub sleeve member 1. To the production tool there further pertains a set of stamp tools 4 which, arranged in distribution in conformity with the pitch of the teeth to be formed integrally, act from radially outwards upon the radially outward face 12 of the main hub sleeve member 1 and, as may be seen, press out torque transmission teeth 3 inwards from the face 11 of the main hub sleeve member 1, and may be seen clearly especially from FIG. 2.

In the axial region of the inner ratchet 3 to be formed the main hub sleeve member 1 is made cylindrically smooth in its external form and has a constant wall thickness. The stamp tools 4 press the material of the main hub sleeve member 1 inwards into the corresponding recesses 6, serving as negative form, of the support mandrel 5, whereby the desired torque transmission teeth of the internal ratchet 3 are integrally formed.

Figure 3:
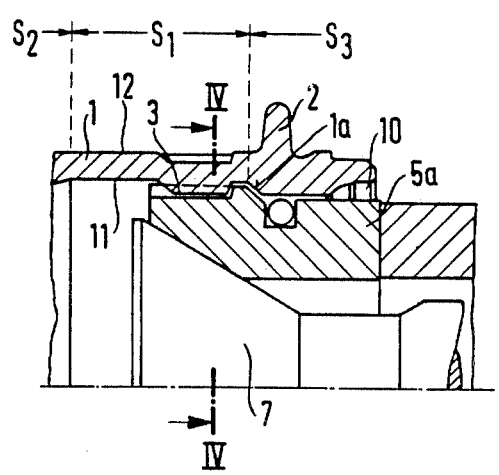
FIG. 3 shows a solid hub sleeve with other tools for swarfless production of an integral internal ratchet in an undercut region of the hub sleeve.
Figure 4:
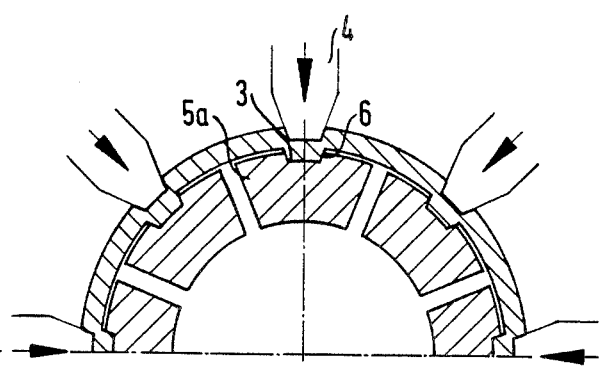
FIG. 4 shows a cross-section along the line IV—IV of FIG. 3.

The production of internal torque transmission teeth in a main hub sleeve member in the axial region of an undercut is shown by the example of embodiment according to FIGS. 3 and 4. FIG. 3 here shows the main hub sleeve member 1 in which an internal ratchet is formed in a longitudinal section $S_1$ of larger internal diameter as compared with adjacent longitudinal sections $S_1$ and $S_3$ of smaller internal diameter. More particularly the ratchet if fromed adjacent a conical control face 1a which is used for controlling the engagement of torque transmission pawls with the torque teeth 3 by axial movement of the pawls. Here as support a radially expandable support unit 5a is used which comprises recesses 6 distributed on its outer surface as negative form of the torque transmission teeth 3 to be formed swarflessly in each segment of the support unit 5a. The segments of the support unit 5a are radially movable into their operative position by a spreading core 7.

As explained above, for the production of the torque transmission teeth in the region of undercuttings of the hub sleeve an arrangement of stamp tools can be used together with a support unit, namely an expanding mandrel for arrangement in the hub sleeve.

It is, however, also possible to form the support member so that the main hub sleeve member is supported in each case in the region of only one torque transmission tooth and the torque transmission teeth are formed individually out of the wall of the main hub sleeve member. Such a method can contribute substantially to the simplification of the tool construction.

Figure 5:
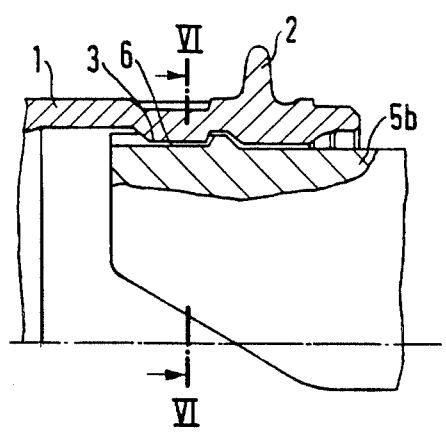
FIG. 5 shows a solid hub sleeve with tools for the swarfless production of an integral internal ratchet in an undercut region of the hub sleeve.
Figure 6:
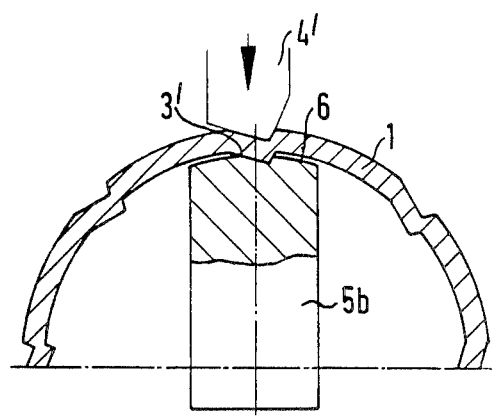
FIG. 6 shows a cross-section along the line VI—VI of FIG. 5.

In FIGS. 5 and 6 such a method is shown. A solid hub sleeve 1 with integral torque transmission teeth 3 for arrangement axially behind an undercutting may be seen. In the forming of the ratchet teeth the main hub sleeve member is supported in the region of each one torque transmission tooth by means of a support mandrel 5b for positioning in accordance with the ratchet pitch.

The form in each case of the torque transmission tooth to be pressed out of the main hub sleeve member is freely selectable and can be adapted by modification of the stamp tools 4 and of the support mandrel 5 to the function and also to the production method.

Figure 7:
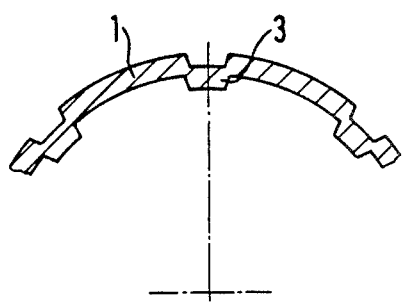
FIG. 7 shows a solid hub sleeve with another swarfless style of production of an integral internal ratchet in cross-section.
Figure 8:
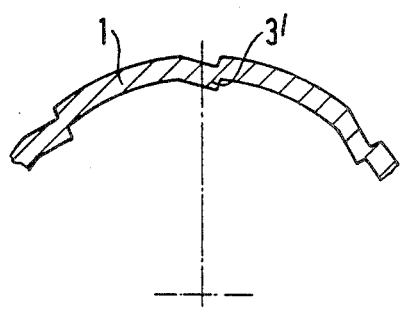
FIG. 8 shows a solid hub sleeve with another swarflessly formed, integral internal ratchet, in cross-section.

FIG. 7 shows internal torque transmission teeth 3 in a solid main sleeve member 1 where the individual torque transmission teeth have approximately the cross-sectional form of a bilaterally acting wedge spline. On the other hand FIG. 8 shows a solid main hub sleeve 1 with saw-tooth shaped toothings 3'.

The wall thickness of the main hub sleeve member 1 in the longitudinal section $S_1$ is about 2 to 4 mm, preferably about 3,5 mm.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A method of manufacturing a bicycle main hub sleeve member (1) having an axis, a radially inward face (11) having a radially inner profile line and a radially outward face (12) having a radially outer profile line, at least one of said radially inner profile line and said radially outer profile line having deviations from a straight line such as to define longitudinal sections ($S_1$, $S_2$, $S_3$) of said main hub sleeve member (1) with differences in wall thickness, ball bearing faces (10) and at least one circular arrangement of torque transmission teeth (3) being integrally formed with said main hub sleeve member (1) at said radially inward face (11), said torque transmission teeth (3) being formed by radially inward dislocations of material of said main hub sleeve member (1), comprising the steps of: profiling a raw member by either forging or/and cold-swaging such as to approximately obtain said radially inward and outward faces (11, 12) of the main hub sleeve member, subsequently machining at least said ball bearing faces (10) in a material removal turning operation, and then stamping torque transmission teeth (3) radially inwardly dislocate the material of said main hub sleeve member (1) using at least one radially inwardly movable stamping tool (4)

radially movable against said radially outward face (12) of said main hub sleeve member (1) and concurrently applying a support unit (5a) to said radially inward face (11), said support having at least one recess (6) to receive the material dislocated by said stamping tool.

2. A method as claimed in claim 1, including providing said circular arrangement of teeth (3) in a longitudinal section ($S_1$) of said main hub sleeve member (1) which has a larger inner diameter than at least one further longitudinal section ($S_2$, $S_3$) of said main hub sleeve member (1), axially introducing said support unit (5a) into said main hub sleeve member (1) and thereupon radially moving said support unit towards the inward face (11) of said longitudinal section ($S_1$) in which said torque transmission teeth (3) are to be stamped.

3. A method as claimed in claim 1, including stamping said torque transmission teeth (3) of said circular arrangement simultaneously by using a plurality of stamping tools (4) and a support unit (5a) having a plurality of recesses (6).

4. A method as claimed in claim 3, including providing said torque transmission teeth (3) in a longitudinal section ($S_1$) of said main hub sleeve member (1) which has a larger inner diameter than at least one further longitudinal section ($S_2$, $S_3$), using a multi-segment support unit (5a), and providing the segments thereof with respective recesses (6) and applying the segments to the inward face (11) of the respective longitudinal sections ($S_1$) by axial movement of a central spreading core (7) engageable with said segments.

5. A method as claimed in claim 2, including stamping said torque transmission teeth (3) at a location spaced axially in the inward face from a conical pawl control face (1a) by a small distance in the range of about 1 to 5 mm, said radially inward face having within said distance an inner diameter substantially corresponding to the inner diameter of the longitudinal section accommodating said torque transmssion teeth (3), and supporting said inward face also within said small distance with said support unit (5a).

6. A method as claimed in claim 5, including stamping said torque transmission teeth (3) at a location spaced axially on the inward face from a conical pawl control face (1a) by a small distance in the range of about 1 to 3 mm.

* * * * *